United States Patent [19]

Iwadoh et al.

[11] Patent Number: 5,171,724

[45] Date of Patent: Dec. 15, 1992

[54] MAGNESIA-ALUMINA TYPE SPINEL CLINKER AND METHOD OF PRODUCING REFRACTORY BY USING SAME

[75] Inventors: Hitoshi Iwadoh, Akaiwa; Takenao Hisamoto, Bizen; Yoshio Yasuda, Bizen; Katsunori Itoh, Bizen; Mitsuteru Takemoto, Bizen, all of Japan

[73] Assignee: Shinagawa Refractories Co., Ltd., Tokyo, Japan

[21] Appl. No.: 709,963

[22] Filed: Jun. 4, 1991

[30] Foreign Application Priority Data

Jun. 11, 1990 [JP] Japan ................................. 2-149844
Jan. 11, 1991 [JP] Japan ................................. 3-12584

[51] Int. Cl.$^5$ ............................................. C04B 35/04
[52] U.S. Cl. ..................................... 501/120; 501/112; 501/127
[58] Field of Search .................... 501/112, 120, 127

[56] References Cited

U.S. PATENT DOCUMENTS 4,389,492  6/1983  Tanemura ........................... 501/112

FOREIGN PATENT DOCUMENTS 3617170  6/1987  Fed. Rep. of Germany.
57-67072  4/1982  Japan ................................. 501/120
1281063  12/1986  Japan.

Primary Examiner—William R. Dixon, Jr.
Assistant Examiner—C. Melissa Bonner
Attorney, Agent, or Firm—Wenderoth, Lind & Ponack

[57] ABSTRACT

A magnesia-alumina type spinel clinker contains $Fe_2O_3$ and $TiO_2$ at boundaries between crystal grains, and a refractory produced by using the clinker has excellent corrosion resistance and cement coating properties. The refractory can thus be applied to the fields of cement rotary kiln refractories, refractories for iron making, steel making and nonferrous refining and the like.

5 Claims, 3 Drawing Sheets

MAGNESIA-ALUMINA TYPE SPINEL CLINKER AND METHOD OF PRODUCING REFRACTORY BY USING SAME

BACKGROUND OF THE INVENTION

The present invention relates to an improved refractory material, a refractory comprising the refractory material and a method of producing the refractory. Particularly, the present invention relates to a magnesia-alumina type spinel clinker having improved cement coating and corrosion resistance properties in a rotary kiln for burning cement. More particularly, the present invention relates to a corrosion-resistant spinel magnesia refractory, particularly a refractory containing $Fe_2O_3$ and $TiO_2$, and a clinker used for producing the refractory.

Magnesia-chrome refractories are generally used as refractories for cement rotary kilns. Magnesia-chrome ores are natural ores and each have a complicated composition containing a spinel ore shown by $Mg,Fe(Cr,Al,Fe)_2O_4$ and impurity components such as $SiO_2$, $CaO$ and the like. A magnesia-alumina type spinel raw material having none of the disadvantages of magnesia-chrome refractories has recently been developed. Magnesia-alumina type spinel refractories produced by using the raw material are increasingly used as lining refractories in cement rotary kilns and other steel-making furnaces.

The durability of such magnesia-alumina type spinel refractories is generally improved by increasing the purity and density thereof or uniformizing the compositions thereof. However, since a deficiency of impurities at boundaries between magnesia and alumina grains causes the absence of inclusion for bonding between raw materials, the textures of such refractories are liable to loosen. When a brick is produced, therefore, the brick must be repeatedly compressed and burnt at a high temperature for increasing the density thereof. However, in this case, a satisfactory bonding state cannot be easily obtained, and the corrosion resistance is poor. When such refractories are applied to a rotary kiln for burning cement, since the cement does not sufficiently coat on and adheres to the inner wall of the kiln so as to protect the inner wall, the coating properties are poor, for example, and the field of application of the refractories is limited.

On the other hand, Japanese Patent Publication No. 60-34513 discloses a method of producing a spinel refractory having improved cement coating properties. This refractory is a spinel magnesia refractory formed by mixing 10 to 50% of spinel ($MgAl_2O_4$) clinker and 50 to 90% of high-purity magnesia clinker, wherein 0.5 to 4.5% by weight of $Fe_2O_3$ is mixed, or part or the whole high-purity magnesia clinker is substituted by a special magnesia clinker containing 3.0 to 5.0% of $Fe_2O_3$ so that the $Fe_2O_3$ content in a brick is 1.6 to 4.6%, thereby improving the cement coating properties.

Examples of methods of producing magnesia-alumina type spinel compositions are disclosed in Japanese Patent Laid-Open Nos. 2-30661 and 59-141461. The former publication discloses a method in which 0.5 to 8% by weight of magnesium titanate is contained as $TiO_2$ in magnesia crystals or at boundaries between spinel grains so as to improve the corrosion resistance. The latter publication discloses a method of mixing 3 to 5% aluminum titanate with a ground spinel clinker in which 20 to 35% by weight of periclase is solid-dissolved, the mixture is molded and sintered, wherein aluminum titanate is preferentially solid-dissolved at boundaries between spinel crystal grains so as to improve the hot strength and spalling resistance.

Although the above conventional magnesia-alumina refractories were selected from refractories having characteristics suitable to the application conditions taking into account a balance between corrosion resistance and coating adhesion, these conventional refractories are still unsatisfactory in corrosion resistance at the firing zone and have some room for improvement.

Accordingly, it is an object of the present invention to provide a magnesia-alumina type spinel refractory having both corrosion resistance and coating adhesion in an attempt to broaden the range of application and improve the durability.

SUMMARY OF THE INVENTION

In one aspect of the present invention, the invention relates to a magnesia-alumina type spinel clinker in which 1.6 to 10% by weight of iron oxide ($Fe_2O_3$) and, as occasion demands, 0.5 to 3% by weight of titania ($TiO_2$) are contained in spinel crystals and/or magnesia crystals and at boundaries between crystal grains.

In still another aspect of the present invention, the invention relates to a magnesia-alumina type spinel refractory containing 0.5 to 5% by weight of $Fe_2O_3$ and 0.5 to 5% by weight of $TiO_2$ in spinel and magnesia crystals and at boundaries between crystal grains.

In a further aspect of the present invention, the invention relates to a method of producing the magnesia-alumina type spinel clinker and the refractory.

DETAILED DESCRIPTION OF THE INVENTION

Figure 1:
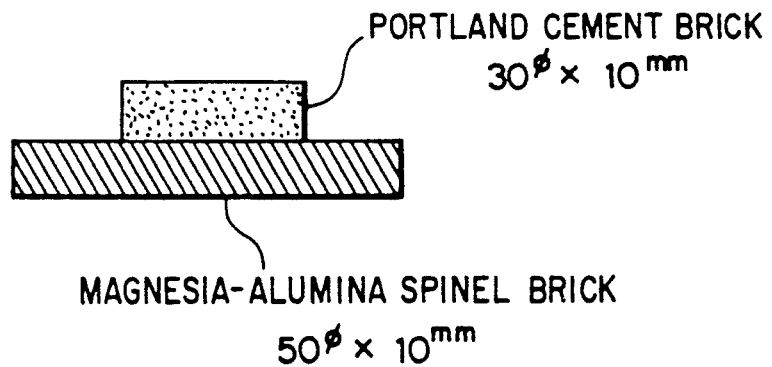
FIG. 1 is a schematic drawing showing the coating test method conducted in Examples 1 and 2.
Figure 2:
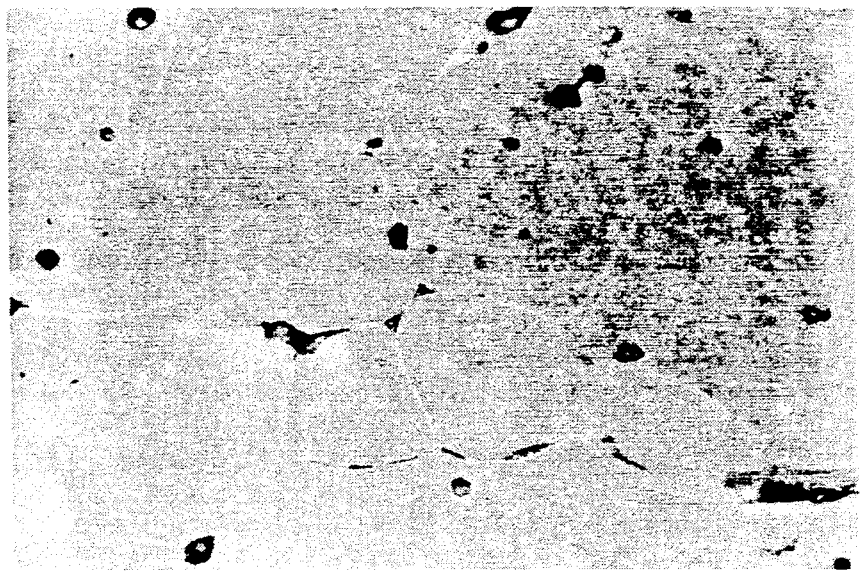
FIG. 2 is a microphotograph showing the grain structure of the refractory 22 obtained in Example 3.
Figure 3:
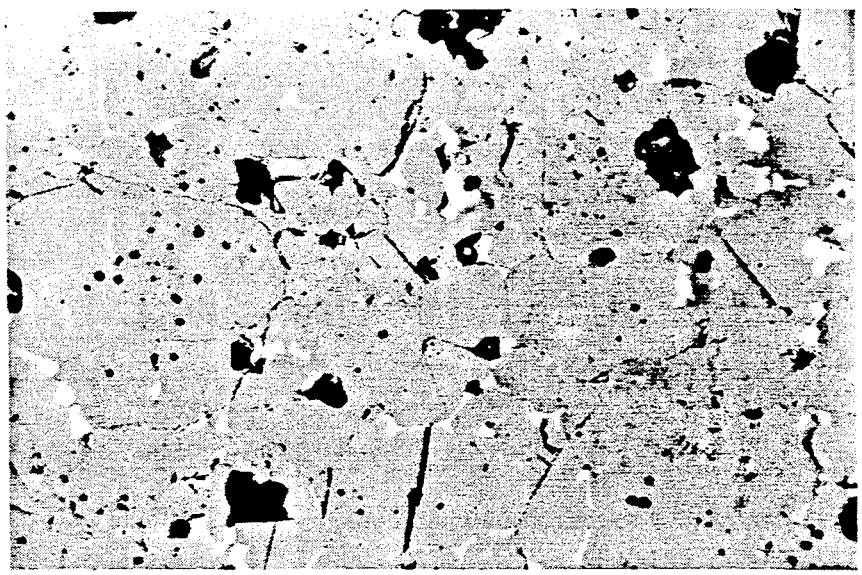
FIG. 3 is a microphotograph showing the grain structure of the refractory 23 obtained in Example 3.
Figure 4:
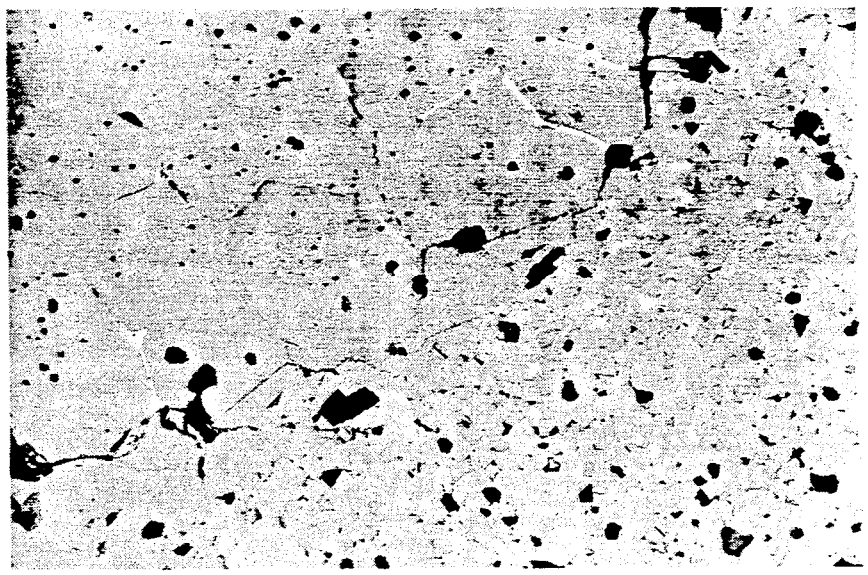
FIG. 4 is a microphotograph showing the grain structure of the refractory 24 obtained in Example 3.
Figure 5:
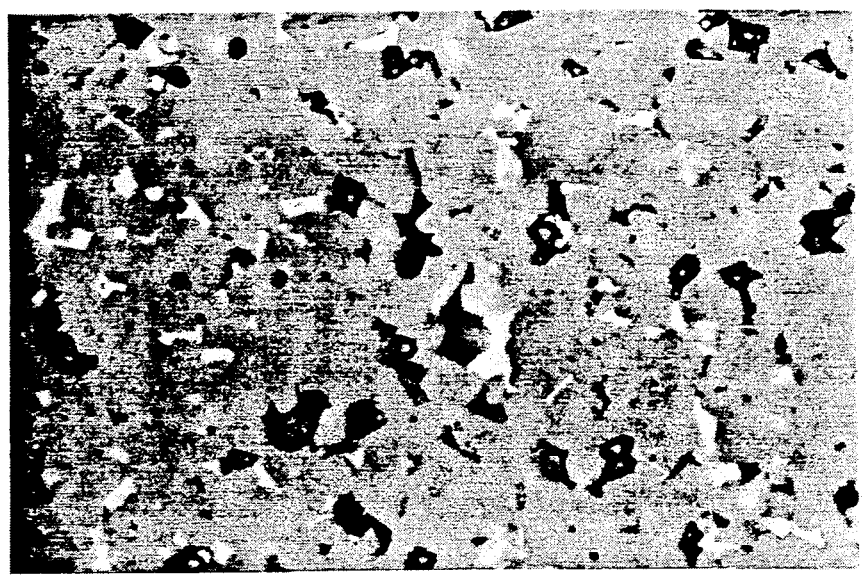
FIG. 5 is a microphotograph showing the grain structure of the refractory 25 obtained in Example 3.

The present invention has been achieved based on the finding that the reaction between a refractory and a cement clinker is determined by characteristics of the refractory, e.g., the main raw material and the composition at boundaries between crystal grains, and that the corrosion resistance or the cement coating adhesion in a rotary kiln for burning cement is improved by appropriately controlling the composition at boundaries between crystal grains.

It is therefore necessary that $Fe_2O_3$ and $TiO_2$ are dispersed in the magnesia-alumina type spinel refractory so that the composition at the boundaries between crystal grains conforms to the purpose of use. $Fe_2O_3$ and $TiO_2$ in an amount of 0.5 to 5% by weight each are preferably mixed and contained in the refractory.

The presence of $Fe_2O_3$ and $TiO_2$ at the boundaries between crystal grains permits improvements in the corrosion resistance and cement coating properties.

In the magnesia-alumina type spinel refractory of the present invention containing $Fe_2O_3$, the $Fe_2O_3$ contained reacts with CaO, $Al_2O_3$ and MgO in the spinel clinker, magnesia clinker and cement to produce CaO-$Al_2O_3$-$Fe_2O_3$ and MgO-$Fe_2O_3$ liquid phases. The production of the CaO-$Al_2O_3$-$Fe_2O_3$ liquid phase, which contributes to the cement coating adhesion, has a remarked effect on the application of the refractory to a rotary kiln for burning cement.

On the other hand, $TiO_2$ reacts with CaO to produce calcium titanate at the boundaries between the spinel and magnesia crystal grains. Although the effect of the production of calcium titanate on densification and sintering is not clarified, the bonding between the spinel and magnesia proceeds to integrate the components, and thus the corrosion-resistant effect is remarkable. (Magnesia-alumina type spinel clinker)

The magnesia-alumina type spinel clinker of the present invention contains 1.6 to 10% by weight of iron oxide ($Fe_2O_3$) in the spinel and/or magnesia crystals and at the boundaries between the crystal grains. More preferably, the magnesia-alumina type spinel clinker further contains 0.5 to 3% by weight of titania ($TiO_2$), and the components $Fe_2O_3$ and $TiO_2$ must be present at the boundaries between the spinel and magnesia crystal grains, which form the spinel clinker.

Although the molar ratio, $MgO/Al_2O_3$, in the spinel clinker can be changed within a wide range, a range of 0.15 to 2.55 is preferable.

The $Fe_2O_3$ amount in the spinel clinker is 1.6 to 10% by weight, preferably 2 to 7% by weight. If the amount of $Fe_2O_3$ added is less than 1.6% by weight, no effect is obtained, while if the amount exceeds 10% by weight, the magnesia-alumina type spinel clinker cannot be easily densified and significantly produces dissolution loss because it reacts with cement to a considerable degree.

The amount of $TiO_2$ added to the spinel clinker is 0 to 3% by weight, preferably 1 to 2% by weight. If the amount of $TiO_2$ added is less than 0.5% by weight, no effect is obtained, while if the amount exceeds 3% by weight, large quantities of aluminum titanate are produced, and the clinker is undesirably made porous because fine cracks are produced due to a difference in expansion between aluminum titanate and the spinel or magnesia crystals.

A method of producing the magnesia-alumina type spinel raw material of the present invention is not particularly limited. For example, the raw material can be produced by mixing a magnesia raw material, an alumina raw material, an iron oxide raw material and a titanium oxide raw material at a predetermined mixing ratio, molding the resultant mixture into a desired shape, drying the molded product, burning it by a kiln such as a tunnel kiln, a rotary kiln or the like at a high temperature of 1700° C. or more, and grinding it into particles having a desired particle size. (Magnesia-alumina type spinel refractory)

The magnesia-alumina type spinel refractory of the present invention contains 0.5 to 5%, preferably 1 to 3% by weight of $Fe_2O_3$ and, more preferably, further contains 0.5 to 5% by weight of $TiO_2$, in the spinel and/or magnesia crystals and at boundaries between the crystal grains which form the refractory.

Although the amount of $Fe_2O_3$ added in the present invention depends upon the degree of corrosion resistance desired, if the amount exceeds 5% by weight, sintering is significant, and thus the spalling resistance, which is the most important characteristic of the magnesia-alumina type spinel refractory, deteriorates. In addition, remarkable dissolution loss occurs due to the reaction with the cement components. The amount of $Fe_2O_3$ added is therefore preferably within the range of 0.5 to 5% by weight.

If the amount of $TiO_2$ added is less than 0.5% by weight, no effect is obtained by the addition, while if the amount exceeds 5% by weight, it is not preferable because the amount of calcium titanate is increased, and thus fine cracks are undesirably produced due to a difference in expansion between the calcium titanate and the spinel or magnesia crystals. In order to make use of the additive effect obtained by combination with $Fe_2O_3$ added, the amount of $TiO_2$ added is preferably within the range of 0.5 to 5% by weight for obtaining an effect.

Examples of methods of producing the magnesia-alumina type spinel refractories of the present invention include the following:

(1) $Fe_2O_3$ only or both $Fe_2O_3$ and $TiO_2$ are added to an aggregate consisting of a spinel clinker and a magnesia clinker each of which has an adjusted grain size; and (2) $Fe_2O_3$ only or both $Fe_2O_3$ and $TiO_2$ are added during synthesis of a spinel clinker, and, if required, $Fe_2O_3$ and/or $TiO_2$ is further added during production of a refractory.

Examples of spinel clinkers that may be used in the production of the magnesia-alumina type spinel refractory of the present invention include the following:

(a) a clinker having a molar ratio $MgO/Al_2O_3$ of 0.15 to 2.55, and $Fe_2O_3$ content of 1.6 to 10% by weight;

(b) a clinker having a molar ratio $MgO/Al_2O_3$ of 0.15 to 2.55, $Fe_2O_3$ content of 1.6 to 10% by weight, and $TiO_2$ content of 0.5 to 3% by weight; and (c) a high-purity clinker (containing small amounts of impurities other than MgO and $Al_2O_3$) having a molar ratio $MgO/Al_2O_3$ of 0.15 to 2.55.

The MgO content of a magnesia clinker that may be used in the present invention is at least 95% by weight.

The $Fe_2O_3$ content and the $TiO_2$ content of the $Fe_2O_3$ and $TiO_2$ materials that may be used in the present invention are at least 98% by weight and 99% by weight, respectively.

A composition containing the raw materials in the above ratio is burnt to obtain the magnesia-alumina type spinel refractory of the present invention. The burning temperature is preferably within the range of 1600° to 1800° C. This is because if the temperature is lower than 1600° C., the refractory is not densified, while if the temperature exceeds 1800° C., the refractory is excessively densified and thus has poor spalling resistance.

EXAMPLES

Methods of the present invention are illustrated with reference to the following examples, but the invention is not intended to be limited only thereto.

EXAMPLE 1

The magnesia, alumina, $Fe_2O_3$ and $TiO_2$ raw materials each having the quality shown in Table 1 were mixed in the ratio shown in Table 2, kneaded, molded into a shape of 230 × 114 × 65 mm, dried at 100° to 110° C. until the weight was constant and then burnt in a tunnel kiln at 1800° C. for 10 hours to produce a magnesia-alumina type spinel clinker.

TABLE 1

| | Component | | | | | |
|---|---|---|---|---|---|---|
| | MgO | Al₂O₃ | Fe₂O₃ | TiO₂ | SiO₂ | CaO |
| Sea-water magnesia clinker | 99.2 | | | | | 0.7 |
| Bayer alumina | | 99.6 | | | 0.1 | |
| Iron oxide fine powder | 0.2 | 0.1 | 98.6 | | 0.6 | |
| Titania fine powder | | | | 99.8 | | |

Table 2 shows the chemical compositions of the magnesia-alumina type spinel clinkers, the physical properties of grains, the compositions of the ores used and the results of cement coating tests.

In the cement coating tests, each of the magnesia-alumina type spinel clinkers obtained was ground to a powder size of 0.3 mm or less, and a 5% aqueous solution of 7% arabic paste was added to the powder obtained for forming a briquette having a size of 50 mmφ × 10 mm. The Portland cement briquettes having a size of 30 mmφ × 10 mm were placed on the briquettes of the magnesia-alumina type spinel, as shown in FIG. 1, and burnt in an electric furnace at 1500° C. for 2 hours. The cement coating properties on the magnesia-alumina type spinel briquette were evaluated by observing the appearance and cutting plane.

The magnesia-alumina type spinel clinkers respectively shown by 1, 2 and 3 in Table 2 are comparative clinkers which are commercially available and each have a typical chemical composition.

Although Fe₂O₃ added was not detected as iron oxide or a compound with another oxide, it was confirmed that Fe₂O₃ is entirely solid-dissolved in the spinel or magnesia crystals or uniformly dispersed at the boundaries between the crystal grains.

In Examples 11 to 15 of the present invention, the amount of Fe₂O₃ was within the range of 1.6 to 10%, and any one of the magnesia-alumina type spinel briquettes was securely bonded to cement. However, in Comparative Examples 1, 2, only a small amount of CaO-Al₂O₃-Fe₂O₃ compound or liquid phase was produced by the reaction with CaO contained in the cement because of shortage of Fe₂O₃, and coating of the cement was insufficient. In Comparative Example 3, although the magnesia-alumina type spinel briquettes sufficiently reacted with the cement because of a large amount of Fe₂O₃ added, and the coating properties were good, large quantities of liquid phases were produced, and thus there was remarkable dissolution loss.

TABLE 2

| | Comparative example | | | Example | | | | |
|---|---|---|---|---|---|---|---|---|
| | 1 | 2 | 3 | 11 | 12 | 13 | 14 | 15 |
| Formulation | | | | | | | | |
| Sea-water magnesia clinker | 30.0 | 28.0 | 25.0 | 28.0 | 27.5 | 26.5 | 25.5 | 48.5 |
| Bayer-alumina | 70.0 | 71.0 | 63.0 | 70.4 | 69.0 | 66.5 | 64.5 | 48.5 |
| powdered iron oxide | | 1.0 | 12.0 | 1.6 | 3.5 | 7.0 | 10.0 | 3.0 |
| Chemical component % | | | | | | | | |
| Al₂O₃ | 69.4 | 70.4 | 62.7 | 70.2 | 68.9 | 66.4 | 64.2 | 48.3 |
| MgO | 29.3 | 27.8 | 24.7 | 27.6 | 27.1 | 26.1 | 25.3 | 48.1 |
| Fe₂O₃ | 0.4 | 1.0 | 11.8 | 1.6 | 3.5 | 6.9 | 9.8 | 3.0 |
| SiO₂ | 0.1 | 0.1 | 0.1 | 0.1 | 0.1 | 0.1 | 0.1 | 0.1 |
| CaO | 0.5 | 0.2 | 0.2 | 0.2 | 0.2 | 0.2 | 0.2 | 0.3 |
| Na₂O | 0.2 | 0.2 | 0.2 | 0.2 | 0.2 | 0.2 | 0.2 | 0.1 |
| MgO/Al₂O₃ mol ratio | 1.07 | 1.0 | 1.0 | 1.0 | 1.0 | 1.0 | 1.0 | 2.5 |
| Particles characteristics | | | | | | | | |
| Apparent porosity (%) | 3.0 | 1.9 | 2.6 | 1.7 | 1.6 | 1.9 | 2.2 | 7.0 |
| Bulk density | | | | | | | | |
| Mineral composition | MgO.Al₂O₃ MgO | MgO.Al₂O₃ | MgO.Al₂O₃ | MgO.Al₂O₃ | MgO.Al₂O₃ | MgO.Al₂O₃ | MgO.Al₂O₃ | MgO.Al₂O₃ MgO |
| Cement coating | X | X | ⊚ | ⊚ | ⊚ | ⊚ | ⊚ | ⊚ |

X: poor coating
⊚: good coating

EXAMPLE 2

A magnesia-alumina type spinel clinker was produced by the same method as that employed in Example 1 with the exception that both Fe₂O₃ and TiO₂ components were added, and then subjected to the same tests as those carried out in Example 1. The results of the tests are shown in Table 3.

This example was different from Example 1 with respect to the behavior of TiO₂. Although TiO₂ reacts with Fe₂O₃ to produce a liquid phase at 1493° C., when TiO₂ is contained in an alumina-magnesia type spinel raw material, TiO₂ preferentially reacts with Al₂O₃ to produce aluminum titanate. In Examples 16 to 21 of the present invention, the amount of TiO₂ was within the range of 0.5 to 3.0% by weight, and the cement coating properties were good. However, in Comparative Example 4, the coating properties were poor because of shortage of TiO₂ and Fe₂O₃. In Comparative Example 5, although the coating properties were good, a large quantity of aluminum titanate was produced because of a large quantity of TiO₂ added, and thus cracks or spherical pores were produced in the magnesia-alumina type spinel raw material due to a difference in expansion between the aluminum titanate and the magnesia or spinel crystals, thereby making the raw material porous. As shown in Comparative Example 4, the addition of small amounts of $TiO_2$ and $Fe_2O_3$ has a densifying effect. However, if the $TiO_2$ amount is increased, the densification of grains deteriorates, and dissolution loss significantly occurs due to the mared reaction with cement. In this case, therefore, the magnesia-alumina type spinel clinker did not sufficiently improve.

at the present time. Comparative Example 8 was produced on an experimental basis for confirming the effect of the addition of $TiO_2$ only.

Refractories 22 to 25 in Example 3 of the present invention exhibited good results within the $Fe_2O_3$ range of 0 9 to 2.9% and the $TiO_2$ range of 0.9 to 2.9%. As

TABLE 3

|  | Comparative example | | Example | | | | | |
|---|---|---|---|---|---|---|---|---|
|  | 4 | 5 | 16 | 17 | 18 | 19 | 20 | 21 |
| Formulation | | | | | | | | |
| Sea-water magnesia clinker | 29.7 | 26.0 | 27.5 | 27.0 | 28.0 | 26.5 | 38.5 | 46.5 |
| Bayer-alumina | 69.0 | 66.0 | 70.0 | 69.0 | 66.0 | 67.5 | 58.0 | 46.5 |
| powdered iron oxide | 1.0 | 3.0 | 2.0 | 3.0 | 3.0 | 5.0 | 2.5 | 5.0 |
| titania | 0.3 | 5.0 | 0.5 | 1.0 | 3.0 | 1.0 | 1.0 | 2.0 |
| Chemical component % | | | | | | | | |
| $Al_2O_3$ | 68.5 | 65.9 | 69.6 | 68.6 | 65.5 | 67.4 | 57.7 | 46.3 |
| MgO | 29.4 | 25.6 | 27.4 | 26.7 | 28.0 | 26.1 | 38.3 | 46.1 |
| $Fe_2O_3$ | 1.0 | 3.0 | 2.0 | 3.0 | 3.0 | 4.9 | 2.5 | 4.9 |
| $SiO_2$ | 0.1 | 0.1 | 0.1 | 0.1 | 0.1 | 0.1 | 0.1 | 0.1 |
| CaO | 0.2 | 0.2 | 0.2 | 0.2 | 0.2 | 0.2 | 0.3 | 0.3 |
| $Na_2O$ | 0.2 | 0.2 | 0.2 | 0.2 | 0.2 | 0.2 | 0.1 | 0.1 |
| $TiO_2$ | 0.3 | 4.9 | 0.5 | 1.0 | 3.0 | 1.0 | 1.0 | 2.0 |
| $MgO/Al_2O_3$ mol ratio | 1.08 | 0.93 | 1.0 | 0.98 | 1.08 | 0.98 | 1.68 | 2.52 |
| Particles characteristics | | | | | | | | |
| Apparent porosity (%) | 1.8 | 7.5 | 2.0 | 1.0 | 1.8 | 1.8 | 4.0 | 6.5 |
| Bulk density | 3.25 | 3.17 | 3.28 | 3.31 | 3.26 | 3.24 | 3.30 | 0.36 |
| Mineral composition | $MgO.Al_2O_3$ MgO | $MgO.Al_2O_3$ $Al_2O_3.TiO_2$ | $MgO.Al_2O_3$ $Al_2O_3.TiO_2$ | $MgO.Al_2O_3$ $Al_2O_3.TiO_2$ $Al_2O_3.TiO_2$ | $MgO.Al_2O_3$ MgO | $MgO.Al_2O_3$ $Al_2O_3.TiO_2$ $Al_2O_3.TiO_2$ | $MgO.Al_2O_3$ MgO $Al_2O_3.TiO_2$ | $MgO.Al_2O_3$ MgO |
| Cement coating | X | ⊙ | ⊙ | ⊙ | ⊙ | ⊙ | ⊙ | ⊙ |

X: poor coating
⊙: good coating

EXAMPLE 3

Magnesia clinker, spinel clinker, iron oxide and titania raw materials each of which had the composition shown in Table 4 and an adjusted grain distribution were mixed at each of the ratios shown in Table 5. The resultant mixture was molded into a shape of 230×114×65 mm and then burnt at 1750° C. to produce a refractory.

TABLE 4

| (Composition of Raw Material. % by weight) | | | | | | |
|---|---|---|---|---|---|---|
|  | MgO | $Al_2O_3$ | $Fe_2O_3$ | $TiO_2$ | $SiO_2$ | CaO |
| Sea water magnesia clinker | 99.2 | | | | | 0.7 |
| Spinel clinker 1 | 50.2 | 48.0 | | | | |
| Spinel clinker 2 | 28.8 | 70.0 | | | | |
| Iron oxide fine powder | | | 98.6 | | 0.6 | |
| Titania fine powder | | | | 99.8 | | |

Table 5 shows the chemical compositions of the refractories obtained and results of the corrosion resisting tests and cement coating adhesion tests. Table 5 also shows the chemical compositions and test results of Comparative Examples.

Comparative Examples 6 and 7 were typical examples of refractories which were commercially available expected, Comparative Examples 6 and 8 exhibited poor coating adhesion because of the absence of $Fe_2O_3$. Comparative Example 7 exhibited coating adhesion comparable with the examples of the present invention. However, in this sample, dissolution loss proceeded preferentially.

It was also confirmed that the addition of $TiO_2$ has the effect of improving the corrosion resistance and infiltration properties.

It was confirmed from the above Examples and Comparative Examples that well-balanced addition of $Fe_2O_3$ and $TiO_2$ is necessary for controlling the reaction with cement coating, keeping good coating adhesion and improving the corrosion resistance.

In the corrosion resistance tests, Comparative Example 6 which contained neither $Fe_2O_3$ nor $TiO_2$ exhibited significant dissolution loss which was caused by the reaction between CaO and $Al_2O_3$. In the case of a corrosive agent containing $Na_2O$ and $K_2O$, it permeated deep into the refractory. Comparative Example 7 containing $Fe_2O_3$ only exhibited the same results. However, the amounts of $Fe_2O_3$ and $TiO_2$ added in the present invention had remarkable effects in decreasing the dissolution loss and infiltration of extraneous components such as $Na_2O$, $K_2O$ and the like, and allowing calcium titanate to remain in the vicinity of the reaction surfaces.

TABLE 5

(parts by weight)

| | Particle size (mm) | Comparative example 6 | 7 | 8 | Example 22 | 23 | 24 | 25 |
|---|---|---|---|---|---|---|---|---|
| Sea-water magnesia clinker | 4~1 | 20 | 20 | 20 | 20 | 20 | 20 | 30 |
| Sea-water magnesia clinker | 1~0.3 | 20 | 20 | 20 | 20 | 20 | 20 | 20 |
| Sea-water magnesia clinker | less than 0.3 | 30 | 30 | 30 | 30 | 30 | 30 | 30 |
| Spinel clinker 1 | 4~0.3 | 30 | 30 | 30 | 30 | 30 | 30 | |
| Spinel clinker 2 | 4~0.3 | | | | | | | 20 |
| Powdered iron oxide | | | 3 | | 3 | 1 | 1.5 | 2 |
| Powdered titania | | | | 3 | 1 | 3 | 1.5 | 2 |
| Apparent porosity (%) | | 16.9 | 14.5 | 15.2 | 14.1 | 15.0 | 14.4 | 15.0 |
| Bulk density | | 2.94 | 3.08 | 3.03 | 3.10 | 3.04 | 3.07 | 3.04 |
| Compression strength (kgf/cm$^2$) | | 400 | 500 | 380 | 520 | 400 | 485 | 510 |
| Spalling test (1) | | No cleavage | No cleavage | No cleavage | No cleavage | No cleavage | No cleavage | No cleavage |
| Chemical composition (%) | | | | | | | | |
| MgO | | 81.5 | 79.0 | 79.0 | 81.8 | 82.0 | 82.0 | 81.8 |
| Al$_2$O$_3$ | | 17.6 | 17.0 | 17.0 | 14.8 | 14.9 | 14.9 | 13.5 |
| Fe$_2$O$_3$ | | | 3.0 | | 2.8 | 0.9 | 1.5 | 1.9 |
| TiO$_2$ | | | | 2.9 | 1.0 | 2.9 | 1.5 | 1.9 |
| Coating adhesibility (2) | | X | Δ | Δ | ○ | ○ | ○ | ○ |
| Corrosion resistance (3) | | | | | | | | |
| Elosion (mm) | | 15 | 11 | 8 | 10 | 8 | 6 | 7 |
| Infiltration (mm) | | 33 | 33 | 13 | 15 | 14 | 9 | 10 |

In Table 5:
(1) shows the results of the repeat test performed by 10 repetition of heating at 1000° C. and water-cooling;
(2) shows the results of adhesion tests in which x means no adhesion; Δ, slight adhesion; and ○, good adhesion; and
(3) shows the results of tests performed by using a corrosive agent (Portland cement : K$_2$SO$_4$=9 : 1) at 1550° C. for 5 hours.
FIGS. 2, 3, 4 and 5 show microphotographs of the grain structures of the refractories 22, 23, 24 and 25, respectively, all of which are obtained in Example 3.

EXAMPLE 4

(Production of Synthetic Spinel Clinker)

Raw materials were mixed with each of the compositions shown in Table 6. After the grain size had been adjusted, each of the resultant mixtures was well kneaded, molded, dried at 100° to 110° C. until the weight became constant and then burnt in a tunnel kiln at 1800° C. for 10 hours to produce synthetic magnesia-alumina type spinel clinkers 1, 2, 3, 4 and 5, each of which contained predetermined amounts of Fe$_2$O$_3$ and TiO$_2$ in the spinel structure.

TABLE 6

(% by weight)

| Component | Synthesis No. 1 | 2 | 3 | 4 | 5 |
|---|---|---|---|---|---|
| Al$_2$O$_3$ | 88.2 | 65.9 | 69.6 | 65.5 | 46.3 |
| MgO | 7.4 | 25.6 | 27.4 | 28.0 | 46.1 |
| Fe$_2$O$_3$ | 3.0 | 8.0 | 2.0 | 3.0 | 4.9 |
| TiO$_2$ | 1.0 | | 0.5 | 3.0 | 2.0 |
| Molar ratio MgO/Al$_2$O$_3$ | 0.21 | 1.0 | 1.0 | 1.08 | 2.52 |

Production of Refractory

Each of the synthesized spinel clinkers 1 to 5 obtained, magnesia clinker, iron oxide, titania and so on were mixed in the mixing ratios shown in Table 7, well kneaded, molded into a shape of 230×114×65 mm in the same way as in Example 1 and then burnt at 1750° C. to produce a refractory.

Table 7 shows the mixing ratios of the raw materials and various characteristics of each of comparative refractories and refractories of the present invention.

TABLE 7

(parts by weight)

| | Particle size (mm) | Comparative example 9 | 10 | Example 26 | 27 | 28 | 29 | 30 |
|---|---|---|---|---|---|---|---|---|
| Sea-water magnesia clinker | 4~1 | 20 | 20 | | 30 | | 10 | 15 |
| Sea-water magnesia clinker | 1~0.3 | 20 | 20 | | 30 | | 10 | 20 |
| Sea-water magnesia clinker | less than 0.3 | 30 | 30 | | 30 | 30 | 30 | 30 |
| Spinel clinker 1 | 4~0.3 | 30 | 30 | | | | | |
| Synthetic spinel clinker 1 | | | | 100 | | | | |
| Synthetic spinel clinker 2 | | | | | 10 | | | |
| Synthetic spinel clinker 3 | | | | | | 70 | | |
| Synthetic spinel clinker 4 | | | | | | | 50 | |
| Synthetic spinel clinker 5 | | | | | | | | 35 |
| Powdered iron oxide | | | 3 | | | | 1.0 | |
| Powdered titania | | | | | 1.5 | 0.5 | | 1.0 |
| Apparent porosity (%) | | 16.9 | 14.5 | 14.7 | 15.3 | 15.2 | 14.0 | 15.1 |
| Bulk density | | 2.94 | 3.08 | 2.90 | 2.92 | 2.94 | 3.00 | 3.03 |
| Compression strength (kgf/cm$^2$) | | 400 | 500 | 530 | 440 | 470 | 560 | 600 |
| Spalling test | | No cleavage | No cleavage | No cleavage | No cleavage | No cleavage | No cleavage | No cleavage |
| Chemical composition (%) | | | | | | | | |
| MgO | | 81.5 | 79.0 | 7.4 | 89.8 | 48.6 | 62.7 | 79.4 |

TABLE 7-continued

|  | Particle size (mm) | Comparative example | | Example (parts by weight) | | | | |
| --- | --- | --- | --- | --- | --- | --- | --- | --- |
|  |  | 9 | 10 | 26 | 27 | 28 | 29 | 30 |
| Al$_2$O$_3$ |  | 17.6 | 17.0 | 88.2 | 6.5 | 48.5 | 32.4 | 16.0 |
| Fe$_2$O$_3$ |  |  | 2.9 | 3.0 | 0.8 | 1.4 | 2.5 | 1.7 |
| TiO$_2$ |  |  |  | 1.0 | 1.5 | 0.8 | 1.5 | 1.7 |
| Coating adhesibility |  | X | Δ | ◯ | ◯ | ◯ | ◯ | ◯ |
| Corrosion resistance |  |  |  |  |  |  |  |  |
| Elosion (mm) |  | 15 | 10 | 12 | 8 | 9 | 9 | 7 |
| Infiltration (mm) |  | 30 | 33 | 19 | 15 | 15 | 12 | 10 |

As seen from Table 7, either when a refractory is produced by using synthetic raw materials in which iron oxide and titania are added to magnesia and spinel clinkers, both of which intrinsically contain neither iron oxide nor titania, or when part of iron oxide and/or titania is added during synthesis of a spinel clinker, there are effects of controlling the infiltration of extraneous components and improving the cement coating properties.

In a 5.4 mφ×95 mL cement burning rotary kiln manufactured by Corporation A, the refractory 30 produced in Example 4 of the present invention was placed on a portion having a width of 2 m at a sintering zone at a distance of 2D from the discharge portion of the kiln, conventional ultra-high temperature burnt magnesia-chrome bricks being placed on the shoot side, and conventional spinel bricks containing iron oxide as comparative refractory 10, being placed on the inner side of the kiln so that the refractory 30 was held between the conventional bricks. The results of a test using the rotary kiln for 180 days are shown in Table 8.

TABLE 8

|  | Product of present invention | Conventional brick | |
| --- | --- | --- | --- |
| Original thickness (mm) | 230 | 230 | 230 |
| Residual thickness (mm) | 160 | 140 | 120 |
| Damage rate (mm/day) | 0.39 | 0.50 | 0.61 |

The refractory of the present invention shows stable coating adhesion and good results, as compared with those of the conventional bricks.

EXAMPLE 6

In a 5.4 mφ cement burning rotary kiln manufactured by Corporation B, the refractory 29 produced in Example 4 of the present invention was used in a transition zone at a distance of 3D to 4D from the discharge port of the rotary kiln, and comparative refractory 9 was placed adjacent to the refractory 29. After a test using the rotary kiln for 235 days, the inside of the kiln was examined. As a result, the surface of the conventional comparative refractory 9 was made brittle and damaged by abrasion, while the refractory 29 of the present invention had a strong structure and thin cement coating which adhered to the surface thereof, and showed no brittleness.

The results of boring were a residual thickness of 200 mm relative to the original thickness of 225 mm, and a damage rate as good as 0.11 mm/day. The refractory of the present invention could be used continuously.

What is claimed is:

1. A magnesia-alumina spinel clinker containing 1.6 to 10% by weight of iron oxide (Fe$_2$O$_3$) and 0.5 to 3% by weight of titania (TiO$_2$) in spinel crystals, magnesia crystals or both, and at the grain boundaries.

2. A method of producing a magnesia-alumina spinel clinker described in claim 1 comprising mixing 25 to 50 parts by weight of magnesia, 50 to 75 parts by weight of alumina and iron oxide in an amount of 1.6 to 10% by weight of the total weight, titania in an amount of 0.5 to 3% by weight of the total weight and then burning the mixture at a temperature of 1700° C. or more.

3. A magnesia-alumina spinel refractory containing 0.5 to 5% by weight of Fe$_2$O$_3$ and 0.5 to 5% by weight of TiO$_2$ in spinel crystals, magnesia crystals or both, and at the grain boundaries.

4. A method of producing a magnesia-alumina spinel refractory of claim 3 comprising adding 0 to 5% by weight of Fe$_2$O$_3$ and 0 to 5% by weight of TiO$_2$ to an aggregate consisting of 10 to 100% by weight of at least one of high-purity spinel clinker, spinel clinker containing 1.6 to 10% by weight of Fe$_2$O$_3$ and spinel clinker containing 1.6 to 10% by weight of Fe$_2$O$_3$ and 0.5 to 3% by weight of TiO$_2$, and 0 to 90% by weight of magnesia clinker, and then molding and burning the mixture.

5. A method of producing a magnesia-alumina spinel refractory of claim 3, comprising adding 0 to 5% by weight of Fe$_2$O$_3$ and 0 to 5% by weight of TiO$_2$ to an aggregate consisting of 10 to 100% by weight of spinel clinker containing 1.6 to 10% by wieght of Fe$_2$O$_3$ and 0.5 to 3% by weight of TiO$_2$ and 0 to 90% by weight of magnesia clinker, and then molding and burning the mixture.

* * * * *